United States Patent Office 2,892,012
Patented June 23, 1959

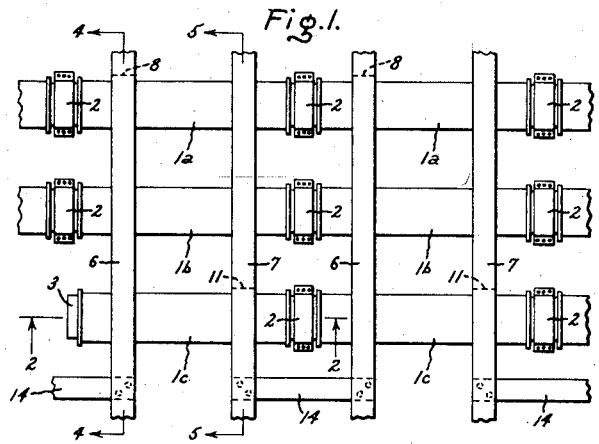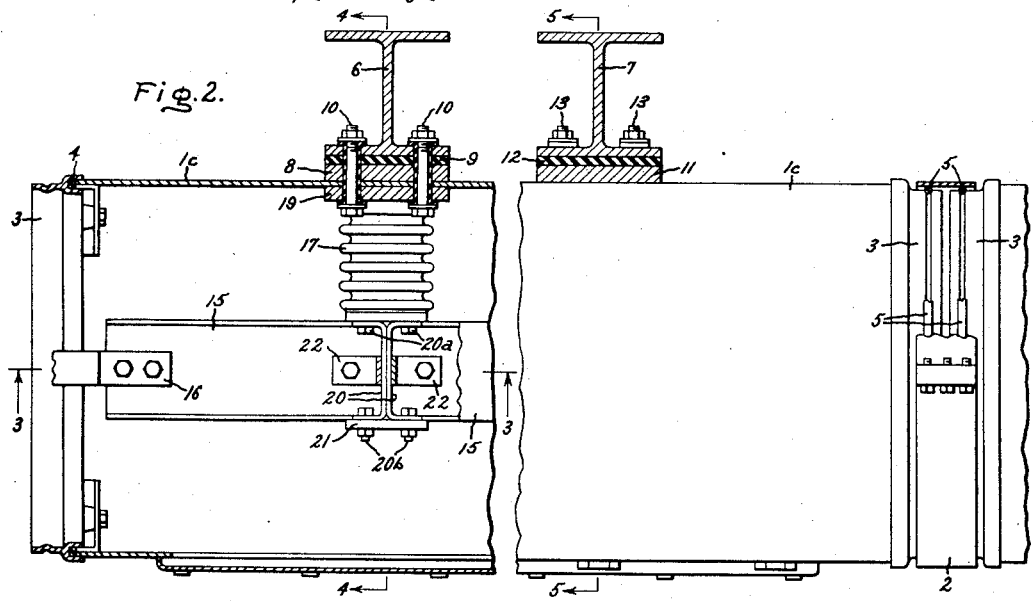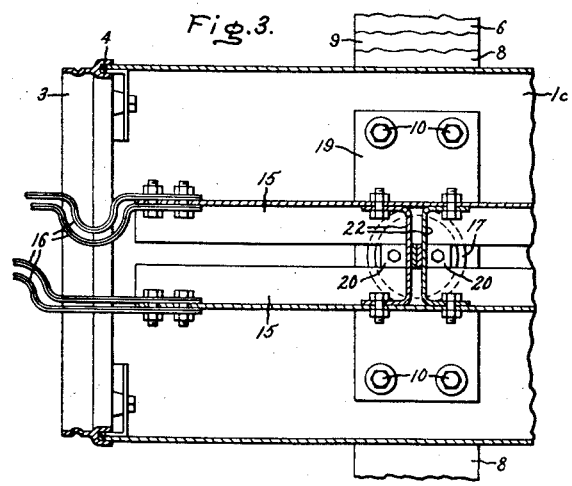

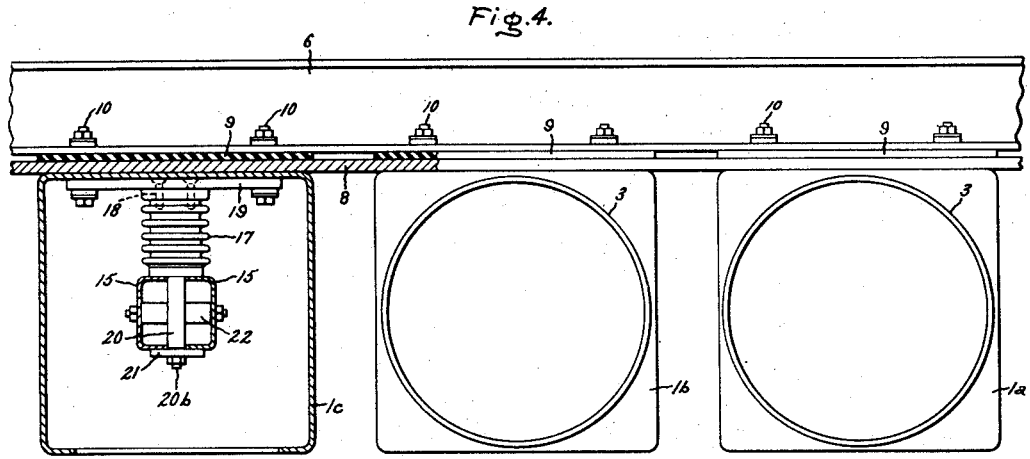
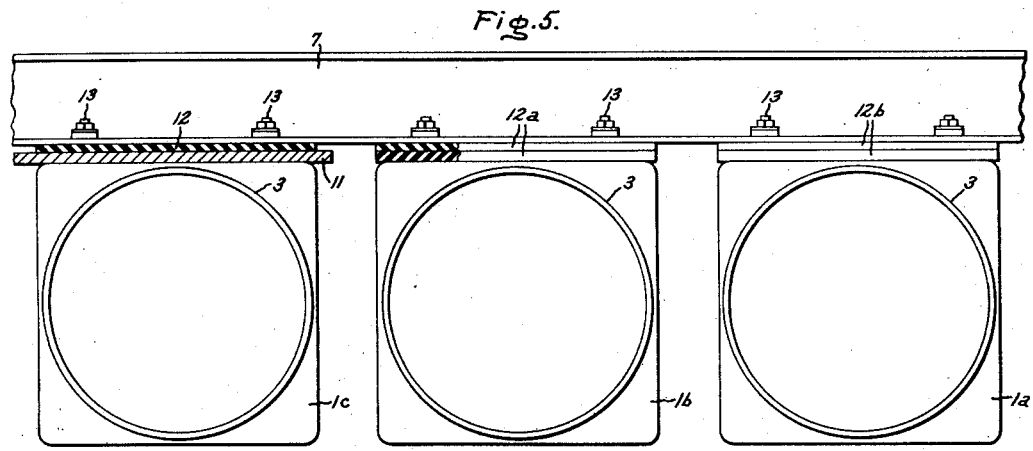
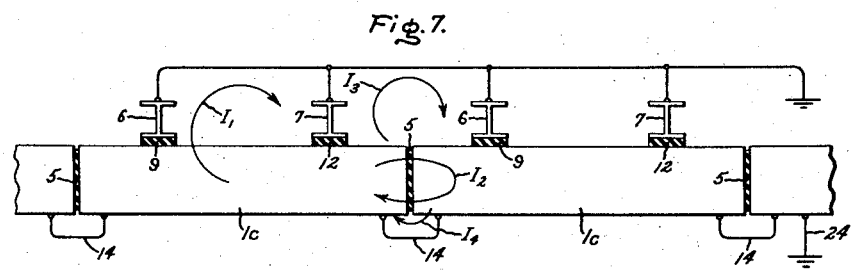
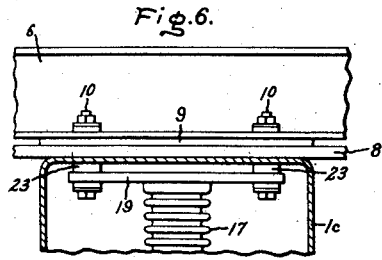
Inventors:
Nathan Swerdlow,
Walter R. Wilson,
by Their Attorney.

2,892,012

ELECTRIC BUS DUCT APPARATUS

Nathan Swerdlow, Philadelphia, and Walter R. Wilson, Bromall, Pa., assignors to General Electric Company, a corporation of New York Application September 28, 1954, Serial No. 458,900

13 Claims. (Cl. 174—99)

Our invention relates to electric bus duct apparatus of the enclosed isolated conductor type, and more particularly, to improved means for minimizing short circuit and ground fault stresses on the bus conductor mountings. The invention is especially applicable to so-called isolated phase bus duct apparatus for three-phase circuits, such as for example the type of enclosed bus duct apparatus shown in Patents 2,570,885, 2,591,386 and 2,647,940 issued to Nathan Swerdlow and George G. Abel.

In enclosed electric bus duct apparatus of the subject type, short circuit and ground fault currents have been thought to produce very severe electromagnetic forces between the electric bus conductors. Such forces, depending upon the relative directions of the currents in any two parallel buses, tend to either spread the buses apart or draw them together. The bus conductors themselves have been made rigid, usually in the form of channel sections, in order to minimize the number of supporting insulators, and have thus been able to resist bending as a result of short circuit forces and the like. Heretofore however it has been thought necessary that, in addition, the supporting means for the buses within their enclosing duct housings, or sheaths, had to be made very sturdy and rigid in order to preclude failure of the supports under short circuit conditions. For example, the bus conductor supports disclosed in the foregoing patents each comprise a pair of oppositely disposed insulating columns between a bus conductor and opposite walls of its coaxial enclosing duct, with the insulators disposed in the plane defined by the axes of the three parallel ducts, so that any electromagnetic forces of repulsion or attraction between the bus conductors are opposed by compressive forces in the insulators, thus rigidly holding the bus conductors in position.

We have discovered that electromagnetic forces between bus conductors resulting from short circuit or ground fault currents are very considerably reduced by electromagnetic shielding action when the buses are encased in metallic enclosing sheaths or housings. Indeed, it has been established by calculation and test, that the actual forces between the buses are between 75% and 95% less when the buses are enclosed in sheaths of low electrical resistivity than would be the case if the buses were unenclosed.

We have discovered also that an electric bus conductor carrying alternating electric current and enclosed by a sheath of conducting material will induce eddy currents in the sheath in such a manner as to force the conductor toward the geometric center of the sheath. Thus, there is an electromagnetic force which is analagous to a mechanical spring, acting to hold the conductor at the sheath center and to restore it to this center if the conductor be displaced.

In addition to the foregoing restoring force, there is a small displacing force which results from the electromagnetic field which penetrates the duct from any nearby conductor outside. This field is fairly constant throughout the interior of any duct, but varies with frequency and with the position of any return conductor outside of the duct. The result is that a freely suspended conductor will be moved away from the centerline until the constant displacing force is just equaled by the spring-like restoring force. At this position there is no continuous resultant force on the conductor. This position we refer to as the "zero force line." A mounted conductor mounted upon a resilient support will move toward this zero force line with its rest position approaching the line as current is increased.

Furthermore, if the enclosing housing or sheath of the electric bus duct is itself used as a return conductor for ground currents, such ground currents flowing longitudinally in the sheath as a return conductor will be symmetrically disposed around the sheath, and therefore will add to the restoring force tending to hold the bus at the sheath center. Because the penetrating field from an external ground return conductor, such as the conventional ground bus, has been eliminated, and because the highly conductive sheaths effectively shields the bus conductor from penetrating fields due to nearby phase conductors, the "zero force line" lies substantially along the centerline of the sheath, and the forces on the supports of a conductor mounted along the sheath centerline are reduced to a very low value.

Accordingly, therefore, it is a principal object of our invention to provide new and improved means for minimizing stresses in enclosed electric bus duct apparatus.

It is a further object of our invention to provide new and improved grounding means for enclosed electric bus duct apparatus.

It is still another object of our invention to provide, in enclosed electric bus duct apparatus of the isolated bus type, new and improved bus mounting means for minimizing electromagnetic stresses on the bus supports.

It is another object of our invention to provide new and improved grounding means for enclosed electric bus apparatus of the isolated conductor type which grounding means is arranged to minimize electromagnetic stresses on the bus mounting.

It is still another object of our invention to provide new and improved grounding and mounting means for enclosed isolated electric bus apparatus, which means cooperate to minimize stresses on the bus supports arising from excessive fault currents of all kinds.

In carrying out our invention in one form, we recognize that substantially equally distributed currents in the conducting sheaths of an isolated phase electric bus apparatus, such as the eddy currents set up by electromagnetic shielding action, tend to maintain each enclosed bus near the central axis of its enclosing sheath or housing. While unbalance in the external electromagnetic field tends to displace an enclosed bus from its central position, the effect of shielding action considerably reduces the effect of such unbalance. Thus while shielding action alone reduces the stress on the bus conductor supports, we further reduce stresses due to short circuit currents and the like by resiliently mounting the bus conductors within the ducts to permit limited movement away from the central axis of the duct toward a "zero force line." By such resilient mounting permitting movement toward the zero force line the magnitude of restoring force, and thus the stress on the bus conductor mounting, is further very considerably reduced. Preferably, we mount each bus within its duct upon a plurality of spaced-apart insulating columns or posts disposed in a plane substantially perpendicular to the plane including the parallel axes of the adjacent bus ducts. Each insulating column or support is mounted upon a resilient plate fixed to a wall of the enclosing duct, so that limited resilient lateral movement of the bust conductor toward its zero force line is permitted, but is opposed by cantilever deflection of the supporting columns.

In accordance with a further feature of our invention, we additionally minimize stresses due to ground current faults by utilizing at least one enclosing sheath itself as a ground return conductor. In this way, any ground current flows along the ground conducting sheath in a manner substantially equally distributed around the sheath, rather than through a separate external parallel ground conductor. As a result, electromagnetic forces of repulsion and attraction due to ground currents are substantially eliminated on the bus enclosed in the ground conducting sheath and in their stead is provided a balanced electromagnetic force tending to maintain that enclosed conductor in central or substantially central position. Any adjacent phase buses are relatively little affected by ground currents in any event, due to their more remote location and shielding.

Our invention will be more fully understood and its further objects and advantages more fully appreciated by referring now to the following detailed specification taken in conjunction with the accompanying drawing, in which Fig. 1 is a fragmentary plan view of a three-phase isolated enclosed electric bus apparatus; Fig. 2 is a side elevational view, partly in section taken along the line 2—2 of Fig. 1; Fig. 3 is a fragmentary cross-sectional view taken along the line 3—3 of Fig. 2; Fig. 4 is a transverse cross-sectional view taken along the line 4—4 of Figs. 1 and 2; Fig. 5 is a transverse cross-sectional view taken along the line 5—5 of Figs. 1 and 2; Fig. 6 is a fragmentary transverse cross-sectional view of a single bus enclosure illustrating another embodiment of our invention; and Fig. 1 is a schematic electric circuit diagram for a single bus duct illustrating the manner in which circulating currents within and between the duct sections are prevented while permitting the flow of ground current through the sheath.

Referring now to the drawing, and particularly to Figs. 1 and 2, we have illustrated a fragmentary section of a three-phase enclosed and isolated electric bus run in which each bus duct is formed of a plurality of open ended tubular enclosing sections 1a, 1b, and 1c of rectangular cross-section insulatingly connected together in end to end relation by clamping bands or coupling collars 2. These duct sections are formed of metal, such as aluminum, having a low electric resistivity. As shown at Fig. 2, each tubular duct section is provided at its ends with a metallic end ring 3 having an inner edge of rectangular cross-section fixed to the end of the duct section with gasketing material 4 disposed therebetween, and providing at its outer edge a protruding flange of circular cross-section for connection to the associated end coupling collar 2. Between each end ring 3 and coupling collar 2, there is disposed a ring 5 of insulating material which acts as a gasket to seal the duct and acts also as an insulator between adjacent duct sections.

Each laterally adjacent group of three parallel and spaced-apart duct sections 1a, 1b and 1c is mounted adjacent its ends upon a pair of transverse supporting I-beams 6 and 7. As shown more clearly at Fig. 2 and 4, there is interposed between the I-beam 6 and the three adjacent duct sections 1a, 1b and 1c a long transverse grounding bar 8 of electric conducting material extending across the three laterally adjacent duct sections in electric conducting relation therewith. The grounding bar 8 is insulated from the I-beam 6 by an interposed strip 9 of insulating material, and the bar 8 and strip 9 are clamped between the I-beam 6 and the duct sections by suitably insulated mounting bolts 10. Beneath the I-beam 7, as shown at Figs. 2 and 5, and in electric conducting relation with only one of the outer laterally adjacent duct sections (1c) is interposed a short electric ground conducting bar 11. Interposed between the short ground conducting bar 11 and the I-beam 7 is a strip of insulating material 12. Between the I-beam 7 and the adjacent bus sections (1a, 1b) of the other two phases are disposed insulating spacers 12a and 12b having a thickness equal to the combined thickness of the ground bar 11 and insulating spacer 12. The I-beam 7 is connected to each laterally adjacent bus section by suitably insulated mounting bolts 13.

As most clearly shown at Fig. 1, each set of three laterally adjacent bus sections is thus supported at one end upon an I-beam 7 and provided with a short ground conducting bar 11 extending outwardly from one side of one outer bus, and is supported at the opposite end by an I-beam 6 and provided with a long transverse grounding bar 8 electrically interconnecting the three laterally adjacent bus sections. Thus each juncture 2 of longitudinally adjacent bus sections is provided at one side with a transverse grounding bar 11 connected to only one outer bus section and at the other side with the long transverse grounding bar 8. Each adjacent pair of these grounding bars 8 and 11 is electrically interconnected in bridging or shunting relation across the insulated section coupling, or juncture, by means of a short longitudinal grounding bar 14. By this means, one outer bus duct (formed of the sections 1c) having its ends directly electrically connected by the bridging bars 14 is utilized as a ground conductor, the bus sheath itself carrying the ground current for the greater part of its length with only the minor juncture portions excluded by the shunting bars 14. In addition, each section, 1a, 1b, of the enclosing sheaths for the other two phases are connected to ground by the transverse grounding bars 8 although excluded from the preferred ground path afforded by the sheath 1c.

Within each sectional bus duct there is centrally disposed a sectionalized electric conducting bus of substantially hollow rectangular cross-sectional configuration, formed of a pair of elongated electric conductors 15 each of U-shaped cross-section and disposed in face to face opposing relation. Each duct section 1a, 1b, 1c has mounted therein one pair of opposed channel-shaped bus conductors 15 having a length substantially equal to the length of the duct section. The bus conductors of each longitudinally adjacent duct section are electrically interconnected by flexible connectors 16 as shown at Figs. 2 and 3, thereby to form a mechanically sectionalized but electrically continuous electric conducting bus extending axially through each of the three sectionalized bus ducts.

Each pair of elongated channel-shaped electric conductor sections 15 is substantially centrally and coaxially mounted within its associated duct section upon a pair of insulator columns or supports 17, one column being disposed near each end of the duct section and extending between the conductor 15 and one wall of the enclosing duct.

Referring now more particularly to Figs. 2, 3 and 4, it will be observed that each insulator column 17 is mounted within its associated duct section 1a, 1b or 1c adjacent one end thereof and immediately under the supporting I-beam 6 or 7. The insulator column is mounted by means of screws 18 upon an elongated metallic base plate 19 which extends substantially entirely across the top wall of the sheath and is bolted at its ends in flatwise engaging relation with the top wall. As best shown in Fig. 2 the mounting plate 19 is fixed in position by the same bolts, 10 or 13 as the case may be, which connect the duct section to the supporting I-beams 6 or 7. It will be noted that these mounting bolts 10 are disposed adjacent the ends of the supporting plate 19, which virtually constitutes a strong flat spring, so that the resilience of the mounting plate permits a certain amount of lateral displacement in a single horizontal plane of the lower end of the insulator post 17. For example, as seen at Fig. 4 a cantilever type angular displacement of the mounting post to the left or the right is permitted.

Upon the lower end of each insulator column 17, and by means of bolts 20a, a first pair of U-shaped supporting brackets 20 is disposed in back-to-back flatwise engaging relation. To the lower diverging ends of the brackets 20 there is fixed by a pair of bolts 20b a bus hanger plate 21. As shown at Figs. 2 and 3, and more particularly at Fig. 3, the oppositely-disposed channel-shape bus sections 15 are slightly spaced apart so that they embrace the U-brackets 20 while being supported by the overhanging hanger plate 21. At each insulator column the conductor bars 15 are joined together and clamped in position about the first pair of brackets 20 by means of a second pair of U-shaped clamping brackets 22 disposed in spaced-apart, back-to-back relation and bolted at their ends to the laterally disposed bottom or bight portions of the opposed U-shaped bus sections 15 (Fig. 3). The clamping brackets 22, when in back to back relation as shown at Figs. 2 and 3, are spaced apart just sufficiently so that they embrace therebetween in engaging relation the perpendicularly disposed first pair of mounting brackets 20, and thus hold the conductor bars 15 in fixed endwise position upon the insulator post 17. This mounting construction is more particularly described and claimed in Patent 2,647,940-Swerdlow, et al. As pointed out in that patent, the clamping brackets 22 may be reversed in position if desired, and thus placed in face to face opposing relation, so that they are spaced from the mounting brackets 20 and thus permit a limited amount of endwise movement of the conductor bars 15 with respect to the insulator.

At Fig. 6 we have shown another embodiment of our invention wherein the resilient mounting plates 19 to which the insulator posts 17 are fixed are spaced apart from the top walls of the duct sections 1a, 1b or 1c by means of insulating spacers 23 disposed between the top wall of the duct section and the resilient mounting plate 19. By such arrangement, the mounting plate 19 is positioned out of contact with the wall of the duct and thus provides a greater freedom of movement of the lower end of the insulator.

At Fig. 7 we have shown a schematic electric circuit diagram of the ground conductor path through the duct sections 1c. The duct is grounded at one end as indicated at 24. As shown at Fig. 7, the supporting I-beams 6 and 7, while inherently constituting a ground connection, are each insuluated from their associated duct sections by the insulating strips 9 and 12 respectively. This insulation prevents the establishment, as by external magnetic fields, of circulating currents such as $I_1$ between the supporting I-beams of any one duct section. As previously pointed out, the adjacent duct sections 1c are insulated from each other by insulating strips 5, and such insulation precludes the establishment of any circulating currents such as $I_2$ across the juncture of the duct sections. Similarly, the insulating strips 5, as well as the insulating strips 9 and 12, preclude the establishment of any circulating currents such as $I_3$ between adjacent I-beams 6 and 7 on opposite sides of a juncture. As pointed out in the foregoing, the insulated duct joints are bridged by grounding jumpers 14, but any circulating current such as $I_4$ which might be set up through this jumper and across the duct joint is prevented by the joint insulation 5. Thus circulating currents which may otherwise be set up due to external fields are interrupted at all connection points, but the conductive jumpers 14 permit the continuous sectionalized duct or sheath 1c to act as an effective conductive ground connection utilizing the greater part of each duct section 1c as the ground conductor. As previously pointed out, circulating eddy currents within any one duct section itself, as due to the external fields from adjacent conductors, serve to provide a shielding action for the included conductor and to this extent are desirable.

It will now be evident that, in operation, the shielding effect of our low resistance enclosing duct or sheath is effective to reduce to a very small value any unbalanced electrical field within the interior of the enclosing sheaths. The magnitude of such unbalanced internal electrical field is further reduced by utilizing one of the sheaths itself as a return ground conductor in the manner described above. What small unbalanced field does remain in the interior of any sheath establishes within that sheath a "zero force line" position of equilibrium toward which the central current-carrying conductor 15 tends to move. Because of the effectiveness of the shielding, this zero force line for each central electrical conductor is only slightly displaced laterally from the normal central position of the conductor. By reason of the deflection permitted by the resilient mounting of our single insulator supports, the conductor 15 is permitted to move to, or substantially to, this "zero force position" even under short circuit conditions. As previously explained, this is an equilibrium position beyond which the conductor 15 has no tendency to move. Accordingly, therefore, after such slight deflection of the insulator mounting there is no further force tending to deflect the insulator, so that the stress in the insulator attains a limited maximum value. Because of the resilience of the insulator mountings, and because the central conductor 15 is in equilibrium when it has deflected to its zero force line "position," the stress in each insulator is allowed to attain a limited value less than its fracturing stress. In prior rigid supporting structures, the stress in each insulator increases continuously as current increases because no movement to any position of equilibrium is permitted by a rigid mounting.

While we have described only a preferred embodiment of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. In an electric bus duct apparatus, an elongated enclosing housing comprising a plurality of open-ended electrically conductive tubular duct sections, electrically insulating connecting means joining said sections together in end-to-end relation to form a continuous duct, means electrically connecting at least one of said sections to ground potential, an elongated electric conductor mounted substantially coaxially within said duct, and electric conductor means connected in spaced-apart bridging relation with each said insulating connecting means between immediately adjacent ends of each juxtaposed pair of said duct sections thereby to constitute with said duct sections a single grounded electric-current-conducting path in which juxtaposed duct sections are connected in series by said conductor means.

2. In an electric bus duct apparatus, an elongated enclosing housing comprising a plurality of open-ended tubular electrically conductive metallic duct sections, electrically insulating connecting means joining said sections together in end-to-end relation to form a continuous enclosing duct, means electrically connecting at least one said duct section to ground potential, an elongated electric conductor mounted substantially coaxially within said duct, and electric conducting bars externally spaced from said duct and electrically connected in bridging relation with each said insulating means between immediately adjacent ends of each juxtaposed pair of said duct sections thereby to constitute with said duct sections a single grounded electric-current-conducting path in which juxtaposed duct sections are connected in series by said bars.

3. In an electric bus duct apparatus, a pair of enclosing housings each comprising a plurality of open-ended tubular electrically conductive duct sections, electrically insulating connecting means joining the sections of each said housing together in end-to-end relation to form a pair of tubular enclosing ducts in parallel spaced apart relation, means electrically connecting at least one section of each said duct to ground potential, means electrically connecting together laterally adjacent sections of said parallel ducts, an elongated electric conductor mounted substantially coaxially within each said duct, and electric conductors externally connected in bridging relation with the insulating connecting means between immediately adjacent ends of each juxtaposed pair of the duct sections of at least one of said housings thereby to constitute with the duct sections of said one housing a single grounded electric-current-conducting path in which juxtaposed duct sections are connected in series by said bridging conductors.

4. In an electric bus duct apparatus, a tubular enclosing duct comprising a plurality of open-ended electrically conductive duct sections, electrically insulating connecting means joining said sections together in end-to-end relation, means electrically connecting at least one said duct section to ground potential, a single substantially rigid elongated electric conductor resiliently mounted substantially coaxially within said duct for limited lateral displacement toward a zero force line position, and electric conductor means connected in spaced-apart bridging relation with said insulating connecting means between immediately adjacent ends of each juxtaposed pair of said duct sections thereby to constitute with said duct sections a single grounded electric-current-conducting path in which juxtaposed duct sections are connected in series by said conductor means.

5. In an electric bus duct apparatus, a tubular enclosing duct comprising a plurality of open-ended electrically conductive duct sections, electrically insulating connecting means joining said sections together in end-to-end relation, means electrically connecting at least one said duct section to ground potential, a plurality of single substantially rigid insulator columns resiliently mounted in co-planar relation within said duct adjacent one wall thereof, said insulator columns being free for limited lateral cantilever movement perpendicular to their common plane, a single substantially rigid elongated electric conductor mounted upon said insulators substantially coaxially within said duct and for limited lateral movement, and electric conducting means connected outside said duct in spaced-apart bridging relation with said insulating connecting means between immediately adjacent ends of each juxtaposed pair of said duct sections thereby to constitute with said duct sections a single grounded electric-current-conducting path in which juxtaposed duct sections are connected in series by said conducting means.

6. In an electric bus duct apparatus, a pair of tubular enclosing ducts each comprising a plurality of open-ended electrically conductive metallic duct sections, electrically insulating means joining the sections of each duct together in end-to-end relation, means mounting said ducts in parallel spaced apart side by side relation, means electrically connecting together each pair of laterally adjacent sections of the two parallel ducts at a single restricted location along the length of said laterally adjacent sections, means electrically connecting at least one section of one of said ducts to ground potential, a plurality of single substantially rigid supporting insulator columns mounted at axially spaced apart points within each said duct adjacent the wall thereof, all the insulators within each duct lying in a common plane perpendicular to the plane including the axes of both said ducts and being mounted for limited cantilever movement in planes perpendicular to said common plane, a single substantially rigid elongated electric conductor mounted upon said insulators within each said duct and substantially coaxially thereof in spaced relation with the wall of the duct, and electric conductor means externally connected in spaced-apart bridging relation with the insulating connecting means between immediate adjacent ends of each juxtaposed pair of sections of one of said ducts thereby to constitute with the sections of said one duct a single grounded electric-current-conducting path in which juxtaposed duct sections are connected in series by said conductor means.

7. In an isolated phase electric bus duct apparatus, a plurality of tubular enclosing ducts disposed in parallel spaced-apart relation and each comprising a plurality of open-ended electrically conductive metallic duct sections of rectangular cross-section, electrically insulating connecting means joining the sections of each said duct together in end-to-end relation, means electrically connecting together at least one group of laterally adjacent sections of all the ducts, means electrically connecting at least one section of one said duct to ground potential, a plurality of supporting insulators mounted in axially spaced-apart relation within each said duct, the insulators within each said duct being resiliently mounted for limited cantilever movement adjacent a wall portion thereof which is parallel to the plane containing the axes of all said ducts, a single substantially rigid elongated electric conductor mounted substantially coaxially within each said duct upon said supporting insulators, and electric-current-conducting means connected exteriorly of at least one said duct and in spaced-apart bridging relation with the insulating connecting means thereof between immediately adjacent ends of each juxtaposed pair of sections thereof thereby to constitute with the sections of said one duct a single grounded electric-current-conducting path in which juxtaposed duct sections are connected in series by said conducting means.

8. An isolated bus duct apparatus for an electric circuit comprising at least one pair of tubular enclosing ducts formed of low resistance electric conducting material and disposed in parallel laterally spaced-apart and substantially co-planar relation, the electric conductivity of said ducts being sufficient to provide appreciable electrical shielding of the interior portions thereof, a plurality of axially spaced-apart single rigid supporting posts of insulating material each mounted for limited lateral cantilever movement upon a separate resilient mounting plate supported adjacent the wall of said housing within said duct, all the said posts in one duct lying in a common plane perpendicular to the plane including the axes of all said ducts, and a single substantially rigid electric conductor mounted substantially co-axially within each said duct upon said posts, said resilient mounting plates having sufficient yieldability to allow each of said conductors to move under short circuit conditions transversely of said common plane to substantially a "zero force line" position without fracturing any of said rigid supporting posts of insulating material.

9. An isolated bus duct apparatus for an electric circuit comprising at least one pair of tubular enclosing ducts formed of low resistance electric conducting material and disposed in parallel laterally spaced-apart substantially co-planar relation, the electric conductivity of said ducts of being sufficient to provide appreciable electrical shielding of the interior portions thereof, a plurality of flat resilient mounting plates disposed within each said duct and supported adjacent the wall thereof in axially spaced-apart relation, a rigid mounting post of insulating material fixed upon each said mounting plate and extending toward the axis of the duct, all the posts in each said duct lying in a common plane perpendicular to the plane including the axes of all said ducts and being free for limited lateral cantilever movement, and a single substantially rigid electric conductor mounted substantially co-axially in each duct upon said posts each of said resilient mounting plates having sufficient yieldability to enable each of said conductors under short circuit conditions to move transversely of said common plane to substantially a "zero force line" position without fracturing any of said insulating supporting posts.

10. An isolated bus duct apparatus for an electric circuit comprising at least one pair of tubular enclosing ducts of rectangular cross-section formed of low resistance electric conducting material and disposed in parallel laterally spaced-apart substantially co-planar relation, the electric conductivity of said ducts being sufficient to provide appreciable electrical shieding of the interior portions thereof a plurality of flat resilient mounting plates disposed in each duct in axially spaced-apart relation and supported adjacent a wall thereof in parallel spaced-apart relation, a supporting post of insulating material fixed upon and extending perpendicularly from each said plate toward the axis of the duct, and a substantially rigid electric conductor mounted substantially co-axially within each said duct upon said posts and spaced from the walls of said duct said resilient mounting plates having sufficient yieldability to enable each of said conductors to move transversely of said common plane under short circuit conditions substantially to a "zero force line" position without fracturing any of said insulating supporting posts.

11. An isolated bus duct apparatus for an electric circuit comprising at least one pair of tubular enclosing ducts formed of low resistance electric conducting material and disposed in parallel laterally spaced-apart substantially coplanar relationship, the electric conductivity of said ducts being sufficiently high to provide appreciable electrical shielding of the interior portions thereof, a single substantially rigid conductor within each duct, resilient means mounting said conductor substantially coaxially with respect to its corresponding duct, said resilient mounting means comprising a plurality of axially spaced-apart single rigid supporting posts of insulating material mounted within each duct adjacent the wall thereof for limited cantilever movement, all said posts in any said duct lying in a common plane perpendicular to the plane including the axes of all said ducts, said resilient mounting means having sufficient yieldability to enable said conductor under short circuit conditions to move transversely of said common plane to substantially a "zero force line" position without fracturing any of said insulating supporting posts.

12. The isolated bus duct apparatus of claim 11 in which one of said tubular ducts comprises a plurality of duct sections mechanically connected together in end-to-end relationship, in combination with means including a conductive connection between the immediately adjacent ends of each pair of juxtaposed sections for causing faults to either of said ducts to flow to ground via a path extending through the series combination of said duct sections whereby said one tubular duct serves as a ground bus for said apparatus.

13. The bus duct apparatus of claim 11 in which said conductors are the adjacent phase conductors of a polyphase bus duct apparatus and in which said short circuit conditions include short circuits occurring between said conductors.

References Cited in the file of this patent

UNITED STATES PATENTS

| | | |
|---|---|---|
| 2,191,645 | De Mask | Feb. 27, 1940 |
| 2,297,279 | Attwood | Sept. 29, 1942 |
| 2,570,885 | Swerdlow et al. | Oct. 9, 1951 |
| 2,591,386 | Swerdlow et al. | Apr. 1, 1952 |
| 2,706,744 | Rudd | Apr. 19, 1955 |